United States Patent
Harayama et al.

(10) Patent No.: US 11,148,435 B2
(45) Date of Patent: Oct. 19, 2021

(54) COLOR MEASUREMENT METHOD, COLOR ADJUSTMENT METHOD, AND PRINTING SYSTEM

(71) Applicant: MIMAKI ENGINEERING CO., LTD., Nagano (JP)

(72) Inventors: Ryuta Harayama, Nagano (JP); Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 122 days.

(21) Appl. No.: 16/502,037

(22) Filed: Jul. 3, 2019

(65) Prior Publication Data
US 2020/0016903 A1 Jan. 16, 2020

(30) Foreign Application Priority Data
Jul. 11, 2018 (JP) .............................. JP2018-131785

(51) Int. Cl.
*B41J 2/195* (2006.01)
*G01J 3/52* (2006.01)
*B41J 2/21* (2006.01)

(52) U.S. Cl.
CPC ................. *B41J 2/195* (2013.01); *G01J 3/52* (2013.01); *B41J 2/21* (2013.01)

(58) Field of Classification Search
CPC ............... B41J 2/355; B41J 2/365; B41J 2/38
See application file for complete search history.

(56) References Cited

U.S. PATENT DOCUMENTS

2011/0299101 A1* 12/2011 Namikata ............ H04N 1/6097
 358/1.9
2019/0251929 A1* 8/2019 Fossati ..................... G09G 5/02

FOREIGN PATENT DOCUMENTS

JP 2009178979 8/2009

* cited by examiner

*Primary Examiner* — Lamson D Nguyen
(74) *Attorney, Agent, or Firm* — JCIPRNET

(57) ABSTRACT

A color measurement method for measuring a color printed by a printing apparatus, a color adjustment method and a printing system are provided. The color measurement method includes: a color measuring step of measuring the color printed by the printing apparatus with an XYZ sensor, which is a colorimeter; and a correcting step of correcting an output value output by the XYZ sensor in the color measuring step. In the correcting step, the output value is corrected using: a correction table in which a correction amount is associated with each position of a color space in an Lab color system, the correction table being prepared in advance for a plurality of XYZ sensors, and a correction factor used to adjust the correction amount in the correction table, the correction factor being individually prepared with respect to the XYZ sensor used in the color measuring step.

9 Claims, 5 Drawing Sheets

Before application of correction table

|     | Before calibration | | | After calibration | |
| --- | --- | --- | --- | --- | --- |
| CCS | Average ΔE | 4.26 | → | Average ΔE | 2.59 |
|     | C | 5.21 | | C | 2.43 |
|     | M | 3.00 | | M | 1.22 |
|     | Y | 4.05 | | Y | 2.83 |
|     | R | 4.04 | | R | 2.38 |
|     | G | 4.64 | | G | 2.98 |
|     | B | 4.31 | | B | 1.93 |
|     | Gray | 3.48 | | Gray | 0.68 |
| FD-9 | Average ΔE | 3.16 | → | Average ΔE | 2.47 |
|     | C | 4.00 | | C | 2.17 |
|     | M | 3.52 | | M | 2.47 |
|     | Y | 2.17 | | Y | 1.20 |
|     | R | 2.81 | | R | 2.18 |
|     | G | 3.51 | | G | 1.69 |
|     | B | 2.91 | | B | 2.92 |
|     | Gray | 3.22 | | Gray | 1.53 |

After application of correction table

|     | Before calibration | | | After calibration | |
| --- | --- | --- | --- | --- | --- |
| CCS | Average ΔE | 4.67 | → | Average ΔE | 1.53 |
|     | C | 5.23 | | C | 0.60 |
|     | M | 4.70 | | M | 1.01 |
|     | Y | 5.98 | | Y | 0.80 |
|     | R | 5.10 | | R | 1.12 |
|     | G | 5.84 | | G | 0.90 |
|     | B | 5.38 | | B | 1.51 |
|     | Gray | 3.83 | | Gray | 0.85 |
| FD-9 | Average ΔE | 3.67 | → | Average ΔE | 1.20 |
|     | C | 4.53 | | C | 0.47 |
|     | M | 3.80 | | M | 0.67 |
|     | Y | 4.49 | | Y | 0.60 |
|     | R | 3.72 | | R | 1.18 |
|     | G | 4.43 | | G | 0.86 |
|     | B | 3.97 | | B | 0.88 |
|     | Gray | 3.31 | | Gray | 2.14 |

FIG. 4

COLOR MEASUREMENT METHOD, COLOR ADJUSTMENT METHOD, AND PRINTING SYSTEM

CROSS REFERENCE TO RELATED APPLICATIONS

This application claims the priority benefit of Japanese Patent Application No. 2018-131785, filed on Jul. 11, 2018. The entirety of the above-mentioned patent application is hereby incorporated by reference herein and made a part of this specification.

TECHNICAL FIELD

The present disclosure relates to a color measurement method, a color adjustment method, and a printing system.

DESCRIPTION OF THE BACKGROUND ART

Conventionally, as a method of evaluating the print result by an inkjet printer, a method of evaluating using a color measuring instrument (color measuring machine) is known (see, e.g., Japanese Unexamined Patent Publication No. 2009-178979, Patent Literature 1). Consideration is made to use the color measuring instrument, for example, when performing color adjustment (color calibration) of matching the color in the print result to a desired color. Furthermore, in recent years, the same image may be required to be printed with a plurality of inkjet printers due to the wider range of intended purpose of the inkjet printers. Then, in this case, for example, color matching (equalization) may be performed in advance, for example, in order to unify the print quality in each inkjet printer. Furthermore, in this case, the color adjustment is performed by printing a predetermined color chart or the like with each inkjet printer, and measuring the color of the print result with a color measuring instrument.

Patent Literature 1: Japanese Unexamined Patent Publication No. 2009-178979

SUMMARY

When color adjustment is performed on an inkjet printer, a spectral color measuring instrument (spectral chromatometer) is conventionally used as a color measuring instrument. For example, color can be appropriately measured with high accuracy by using the spectral color measuring instrument. However, since the spectral color measuring instrument has a configuration that uses a complex optical system and an expensive sensor, the cost of the apparatus used at the time of measurement will be greatly increased. Furthermore, when color matching of a plurality of inkjet printers is performed, it may be necessary to perform color matching on a plurality of inkjet printers located at physically separated positions. In this case, it is necessary to prepare a spectral color measuring instrument at least for each place where the inkjet printer is installed, which further increases the cost of the apparatus. Furthermore, depending on the intended purpose of the inkjet printer, it may be preferable to provide a color measuring instrument individually for each inkjet printer. In such a case, if a spectral color measuring instrument is used as a color measuring instrument, the cost of the apparatus will increase significantly.

Therefore, conventionally, it has been desired to more appropriately measure the color printed by a printing apparatus such as an inkjet printer. The present disclosure provides a color measurement method, a color adjustment method, and a printing system capable of solving the problems described above.

The inventors of the present application considered using a device other than a spectral color measuring instrument (e.g., a more inexpensive device) as a color measuring instrument to be used for color measurement on a print result. Specifically, the inventors considered using a densitometer, a colorimeter, and the like for such a device. The inventors then found that among these apparatuses, it is possible to use a colorimeter for color measurement on a print result in terms of measurement accuracy and the like. However, the colorimeter usually has many variations in characteristics. Therefore, for example, if a plurality of colorimeters are used when performing color matching of a plurality of inkjet printers, color matching with high accuracy may become difficult to perform due to the influence of variations in the characteristics of the colorimeters.

On the other hand, the inventors of the present application initially considered correcting the output value of the colorimeter using a correction table created according to the characteristics of each colorimeter. In this case, as the correction table, for example, a table in which the correction amount is associated with each position in a color space in a Lab color system is used. However, in order to create such a correction table, it is usually necessary to perform a measurement that requires a lot of time for each colorimeter. Furthermore, the file (file of electronic data) indicating such a correction table is a file of a large capacity of about several MB or more (e.g., 10 MB or more). In this case, if individual correction table is prepared for each colorimeter, a large storage capacity is required to store all the correction tables. Moreover, the correction table may be stored, for example, in a storage incorporated in a member (e.g., color calibrator) used to adjust the color of the printing apparatus. In this case, a storage with a large capacity is required, which causes a significant increase in cost.

On the other hand, the inventors of the present application conducted an intensive research, and considered not preparing an individual correction table for each colorimeter but preparing a common correction table for a plurality of colorimeters, and then preparing a correction factor to use for the adjustment of the correction amount in the correction table for each colorimeter. When configured in this way, for example, data with a much smaller amount of data than the correction table can be used as the correction factor. Therefore, if configured in this way, for example, the amount of data of parameters used to correct the output value of the colorimeter can be significantly reduced. Furthermore, such a correction factor can be easily stored in a storage with a small capacity, if necessary. Moreover, such a correction factor can usually be created with less man-hours than at the time of creating the correction table. Furthermore, the inventors of the present application actually conducted experiments and the like, and confirmed that the influence of variation in the characteristic of the colorimeter can be appropriately suppressed by the configuration described above. The inventors of the present application found, through further intensive research, the features necessary for obtaining such effects and contrived the present disclosure.

In order to solve the above problems, the present disclosure provides a color measurement method for measuring a color printed by a printing apparatus, the color measurement method including a color measuring step of measuring the color printed by the printing apparatus with a colorimeter; and a correcting step of correcting an output value output by the colorimeter in the color measuring step, in which in the correcting step, the output value is corrected using a correction table in which a correction amount is associated with each position of a color space in an Lab color system, the correction table being prepared in advance for a plurality of colorimeters, and a correction factor used to adjust the correction amount in the correction table, the correction factor being individually prepared with respect to the colorimeter used in the color measuring step.

With such a configuration, for example, the influence of the variation in the characteristic of a colorimeter can be appropriately suppressed. Furthermore, in this case, for example, the data amount of parameters used for correcting the output value of the colorimeter can be significantly and appropriately reduced. Moreover, for example, the measurement of the color printed by printing apparatus such as an inkjet printer thus can be more appropriately performed.

Here, in this configuration, the color to be printed refers to, for example, the color to be represented in a printed matter printed on the medium to be printed. Furthermore, the operation of the correcting step can be considered to be performed, for example, after the operation of the color measuring step. In this case, in the color measuring step, for example, the output value of the colorimeter is acquired without performing the correction using the correction table and the correction factor. The operation of the correcting step may be performed simultaneously with the operation of the color measuring step. In this case, in the color measuring step, for example, an output value after the correction using the correction table and the correction factor is acquired. Moreover, it is conceivable to use an XYZ sensor as a colorimeter. In this case, for example, a known XYZ sensor or the like can be suitably used. According to such configuration, for example, the measurement by the colorimeter can be appropriately carried out.

Furthermore, in the color measuring step, the colorimeter outputs, as an output value, for example, a value associated with the color in the Lab color system. Moreover, in this configuration, each of the plurality of colorimeters targeted by the correction table is associated with, for example, different printing apparatuses. In this case, each colorimeter is used, for example, when measuring the color printed by the corresponding printing apparatus. With this configuration, for example, color matching and the like with respect to a plurality of printing apparatuses can be appropriately performed using a colorimeter.

Furthermore, as the correction factor, for example, it is conceivable to divide the color space in the Lab color system into a plurality of regions and use the factor set for each region. In this case, as the correction factor corresponding to the respective regions, for example, a factor for L value, a factor for a value, and a factor for b value are set. According to this configuration, for example, the correction of the output value according to the characteristic of each colorimeter can be appropriately performed using the correction factor having a small data amount. In this case, it is conceivable to divide the color space in the Lab color system into, for example, a red region, a blue region, a green region, and other regions.

Furthermore, in this configuration, in the correcting step, a correction table file, which is a file indicating the correction table, and a correction factor file, which is a file indicating the correction factor, are used. In this case, the file is a file of electronic data. In this case, a capacity of the correction factor file corresponding to one of the colorimeters is, for example, less than or equal to $1/1000$ of a capacity of the correction table file. Furthermore, a capacity of the correction factor file corresponding to one of the colorimeters is more preferably less than or equal to $1/10000$ of a capacity of the correction table file.

Moreover, in this configuration, it is conceivable that, in the color measuring step, color measurement is performed using, for example, a color calibrator including a colorimeter and a storage. In this case, it is conceivable to store the correction factors corresponding to the respective colorimeters in the storage in the color calibrator including the relevant colorimeter. As such a storage, for example, it is conceivable to use a storage that has a storage capacity for storing the correction factor but insufficient to store the correction table. In this case, in the correcting step, for example, the output value output by the colorimeter is corrected using the correction factor stored in the storage in the color calibrator and the correction table stored in any device exterior to the color calibrator. With this configuration, for example, even when a color calibrator including only a storage with a small storage capacity is used, information unique to each colorimeter can be appropriately stored in each color calibrator. Thus, the correction of the output value with respect to the respective colorimeters can be more easily and more appropriately carried out.

In this configuration, as the correction table, for example, it is conceivable to use a table created based on a difference between a result of measuring a predetermined color with a first colorimeter, and a result of measuring the predetermined color with a second colorimeter different from the first colorimeter. Furthermore, in this case, the plurality of colorimeters targeted by the correction table are three or more colorimeters including the first colorimeter and the second colorimeter. Then, when creating the correction table, for example, a range of variation of the output values of the plurality of colorimeters is confirmed, and a colorimeter whose output value is closest to a center of the range of variation is used as the first colorimeter. In addition, a colorimeter in which the characteristic of the output value is farthest from the first colorimeter is used as the second colorimeter. According to such a configuration, for example, a correction table commonly used for a plurality of colorimeters can be appropriately created.

Furthermore, as a configuration of the present disclosure, it is also conceivable to use a color adjustment method, a printing system, and the like having the features corresponding to the above. In this case as well, for example, effects similar to the above can be obtained.

According to the present disclosure, for example, the color printed by the printing apparatus can be more appropriately measured.

BRIEF DESCRIPTION OF THE DRAWINGS

FIG. 1A shows an example of a configuration of the printing system 10. FIG. 1B shows an example of a configuration of a main part of a color measurement device 106 used in the printing system 10.

FIG. 2A shows the correcting operation performed in the present example. FIG. 2B shows an example of a way of setting a correction factor.

FIG. 4 is a view describing the effect of the correction performed in the present example.

DESCRIPTION OF EMBODIMENTS

Figure 1A:
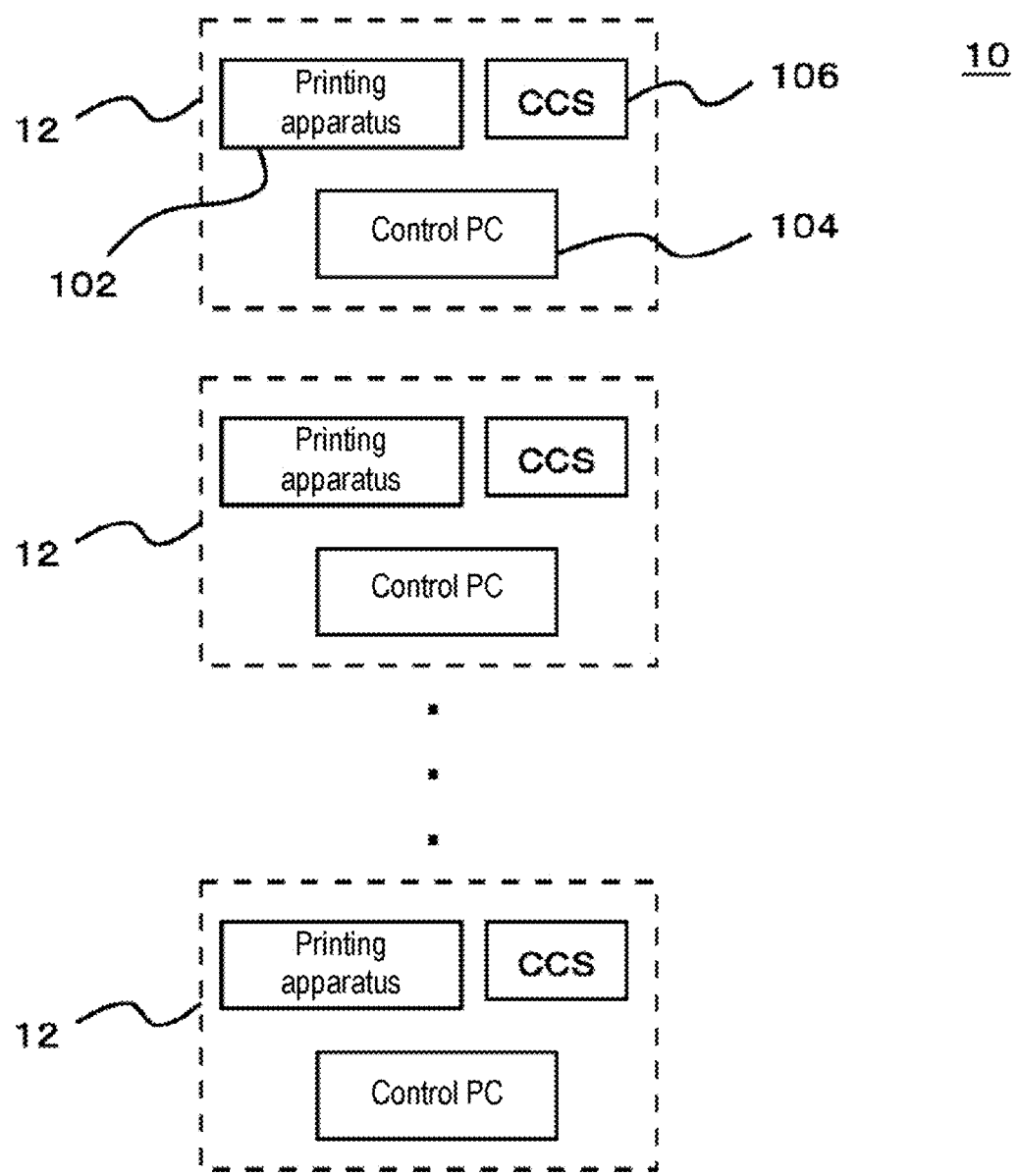
FIGS. 1A and 1B are views showing an example of a printing system 10 according to one embodiment of the present disclosure.
Figure 1B:
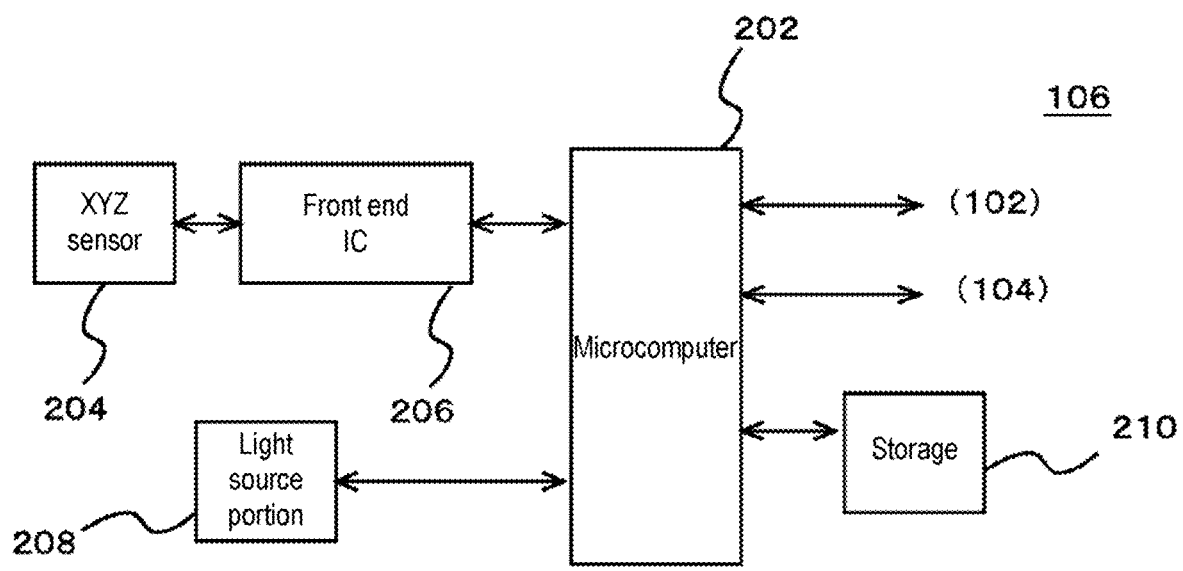

Hereinafter, an embodiment according to the present disclosure will be described with reference to the drawings. FIGS. 1A and 1B show an example of a printing system 10 according to one embodiment of the present disclosure. FIG. 1A shows an example of a configuration of the printing system 10. FIG. 1B shows an example of a configuration of a main part (main components) of a color measurement device 106 used in the printing system 10. The printing system 10 is a printing system that performs printing by a plurality of printing apparatuses, and executes equalization of performing color matching on a plurality of printing apparatuses as needed. Furthermore, in the present example, the printing system 10 includes a plurality of printing units 12. In this case, the printing unit 12 has, for example, a configuration of executing printing using one or more printing apparatuses. Each printing unit 12 also includes a printing apparatus 102, a control PC 104, and a color measurement device 106.

The printing apparatus 102 is an inkjet printer that executes a printing operation in each printing unit 12. The printing apparatus 102 executes the printing operation on a medium (media) to be printed using the inkjet head that ejects ink droplets through an inkjet method. More specifically, in the present example, the printing unit 12 includes a plurality of inkjet heads that respectively eject ink droplets of different colors, and performs color printing (e.g., full color printing). Furthermore, as each of the plurality of inkjet heads, at least an inkjet head for each color of cyan (C), magenta (M), yellow (Y), and black (K) is provided. According to this configuration, for example, the color printing by the subtractive color mixing method can be appropriately performed. Moreover, in the present example, the printing apparatus 102 in each of the printing units 12 is an example of a printing portion that ejects ink droplets. For example, a known inkjet printer can be suitably used as the printing apparatus 102. In this case, using a known inkjet printer as the printing apparatus 102 may be, for example, using a known inkjet printer as a main body part that constitutes the main part of the printing apparatus 102.

The control PC 104 is a computer (host PC) that controls the printing operation by the printing apparatus 102. The control PC 104 generates data for controlling the operation of the printing apparatus 102 based on, for example, image data indicating an image to be printed by the printing apparatus 102, and provides the data to the printing apparatus 102. The control PC 104 thereby controls the printing operation by the printing apparatus 102. More specifically, it is conceivable that the control PC 104 performs, for example, the RIP process and the like based on image data and supplies a raster image generated by such process to the printing apparatus 102. Furthermore, in the present example, the control PC 104 in each printing unit 12 is an example of a controller that controls the operation of the printing portion.

Furthermore, as described above, in the printing system 10 of the present example, equalization is performed as needed. Then, in this case, the control PC 104 controls the operation of the printing apparatus 102 based on the setting reflecting the result of the equalization. More specifically, in this case, for example, it is conceivable to perform a process reflecting the result of the equalization and the like in the RIP process. As another method, for example, it may be considered to individually adjust the volume of ink droplets ejected by the inkjet head for each color. Furthermore, depending on the configuration of the printing apparatus 102, for example, consideration may be made to execute a printing operation reflecting the result of equalization irrespective of the control of the control PC 104. In this case, the control PC 104 may control the operation of the printing apparatus 102 without taking the result of equalization into consideration.

The color measurement device 106 is a color calibrator (CCS) used at the time of executing the equalization. The color measurement device 106 can also be considered as, for example, a sensor unit for color measurement used for color matching of the printing apparatus 102. Furthermore, in the present example, as shown in FIG. 1B, the color measurement device 106 includes a microcomputer 202, an XYZ sensor 204, a front end IC 206, a light source portion 208, and a storage 210. Each of these configurations is mounted on, for example, a plurality of substrates (not shown).

Among these configurations, the microcomputer 202 is a controller (microcontroller) for controlling the operation of the color measurement device 106, and is mounted on a main substrate in the color measurement device 106 to control the operation of each configuration of the color measurement device 106. As the microcomputer 202, for example, a known 16-bit microcomputer and the like can be suitably used. More specifically, in the present example, for example, a 16-bit flash microcontroller including a dual partition flash memory is used as the microcomputer 202.

The XYZ sensor 204 is a sensor that executes color detection in the color measurement device 106, and is mounted on a substrate (sensor substrate) for a sensor different from the main substrate. Furthermore, in the present example, the XYZ sensor 204 is an example of a colorimeter, and is used when measuring the color printed by the printing apparatus 102. In this case, the color printed by the printing apparatus is, for example, the color to be represented in a printed matter printed on the medium. The XYZ sensor 204 can also be considered as, for example, a color measuring instrument or the like that measures color in the color measurement device 106.

Furthermore, in the present example, a sensor that detects each stimulus value of X, Y, and Z in the XYZ color system is used as the XYZ sensor 204. In this case, the XYZ color system is, for example, a color system based on CIE 1931 or a color system based on DIN 5033. Moreover, detecting each stimulus value of X, Y, Z means, for example, measuring a color using a tristimulus function method based on CIE 1931 or DIN 5033. For example, XYZ values can be obtained directly by using such XYZ sensor. Furthermore, for example, a corresponding Lab values can be ultimately calculated based on the acquired XYZ values. In this case, Lab values are L values (L * values), a values (a * values), and b values (b * values) that represent colors in the Lab color system (Lab color space). Furthermore, for example, a known XYZ sensor can be suitably used as such XYZ sensor 204.

Furthermore, in the present example, the XYZ sensor 204 is used at the time of measurement (color measurement) of the color printed by the printing apparatus 102 in the same printing unit 12. Therefore, for example, the plurality of XYZ sensors 204 used in the plurality of printing units 12 in the printing system 10 can be assumed to be associated with different printing apparatuses 102. In addition, each of the XYZ sensors 204 can be considered to be used, for example, when measuring the color printed by the corresponding printing apparatus 102.

The front end IC 206 is an IC used to transmit the output of the XYZ sensor 204 to the microcomputer 202. For example, it is mounted on the sensor substrate together with the XYZ sensor 204. Furthermore, in the present example, the front end IC 206 is a multi-channel programmable gain transimpedance amplifier provided with an AD converter, and converts the output that the XYZ sensor 204 outputs as an analog signal into a digital signal, and provides the digital signal to the microcomputer 202.

The light source portion 208 is a configuration that irradiates light to a measuring position at the time the color is measured by the XYZ sensor 204. In the present example, the light source portion 208 includes, for example, an LED for illumination that generates white light and an LED driver. A known LED for illumination and LED driver can be suitably used as the LED for illumination and the LED driver. More specifically, it is conceivable to use, for example, a white LED having a spectral distribution characteristic close to a sunlight of 5000K as the LED for illumination. Furthermore, for example, it is conceivable to use a 3-ch output LED driver/controller or the like as the LED driver. Moreover, for example, it is conceivable to mount the LED driver on the main substrate together with the microcomputer 202.

The storage 210 has a configuration of storing various parameters and the like related to the color measurement device 106. For example, an EEPROM can be suitably used as the storage 210. Furthermore, in the present example, the storage 210 stores a correction factor set in advance in association with the XYZ sensor 204. The correction factor will be described in more detail later.

Furthermore, in the present example, the color measurement device 106 can be connected to the printing apparatus 102 and the control PC 104. In this case, the color measurement device 106 can be used integrally with the printing apparatus 102 by connecting the color measurement device 106 and the printing apparatus 102. Moreover, in this case, the color measurement device 106 is connected to the printing apparatus 102 by a cable, for example, by I2C communication. The color measurement device 106 is connected to the control PC 104 through, for example, a USB terminal and a USB cable. In this case, for example, the color measurement device 106 can be used stand-alone by connecting the color measurement device 106 and the control PC 104. In addition, the color measurement device 106 may further have a configuration other than the above. More specifically, the color measurement device 106 may further include, for example, a shutter for preventing mist from entering the XYZ sensor 204, a thermistor for monitoring the temperature of the white LED, and the like.

According to the present example, for example, in each of the printing units 12, measurement of the color printed by the printing apparatus 102 (measurement by the XYZ sensor 204) can be appropriately performed using the color measurement device 106. Furthermore, for example, color adjustment (color calibration) or the like for matching the color in the print result to a desired color can thereby be appropriately performed. Moreover, equalization can be appropriately executed by performing color adjustment in accordance with a common reference on the printing apparatus 102 in each printing unit 12. This allows the print quality by the plurality of printing apparatuses 102 to be appropriately unified.

Furthermore, as described above, in the color measurement device 106 of the present example, the color measurement is performed using the XYZ sensor 204. A known XYZ sensor can be used as the XYZ sensor 204. In this case, since the optical system has a simple configuration, the XYZ sensor can usually be obtained inexpensively. Therefore, according to the present example, for example, equalization and the like can be appropriately executed using a low-cost color measurement device 106.

Here, conventionally, it was common to use a spectral color measuring instrument (spectral chromatometer) as a color measuring instrument to be used when performing equalization and the like. In this case, the spectral color measuring instrument is a device that acquires spectral values of colors using a spectrometer and a sensor array. The spectral color measuring instrument can be considered, for example, as a device that measures the relationship between the wavelength of light and the intensity (spectral spectrum). Moreover, when measuring a color using a spectral color measuring instrument, for example, XYZ values can be calculated from the spectral values. Furthermore, Lab values can be ultimately calculated based on the XYZ values. However, the spectral color measuring instrument has a configuration that uses a complex optical system and an expensive sensor. Thus, when the spectral color measuring instrument is used as the color measuring instrument, the cost of the device required for measurement usually increases.

On the other hand, in the present example, as described above, the cost of the color measurement device 106 is significantly reduced by using the XYZ sensor 204. However, the XYZ sensor usually has large variation in characteristics compared to a spectral color measuring instrument or the like, and the accuracy of color measurement is poor. Therefore, if the color measurement device 106 merely uses the XYZ sensor, the influence of variations in the characteristics of the sensor may increase. As a result, it may be considered that equalization or the like cannot be appropriately performed. On the other hand, in the present example, the influence of variations in the characteristics is appropriately suppressed by correcting the output value of the XYZ sensor. An inexpensive color measurement device 106 having a relatively high accuracy is thereby realized.

A densitometer and the like are also known other than the XYZ sensor and the spectral color measuring instrument as a sensor used for color measurement. In this case, the densitometer is, for example, a device that measures color concentration using a filter of each color of RGB and a sensor. However, when the densitometer is used to measure color, the Lab values usually cannot be acquired. In this case, it is difficult to use it as a color measuring instrument for performing equalization and the like. Furthermore, the Lab values can be acquired with for example, a spectroscope type densitometer. However, in this case, the cost is assumed to increase as in the case in which a spectral color measuring instrument is used. Therefore, in order to perform equalization and the like using the low-cost color measurement device 106, it is preferable to use an XYZ sensor as in the present example.

Figure 2A:
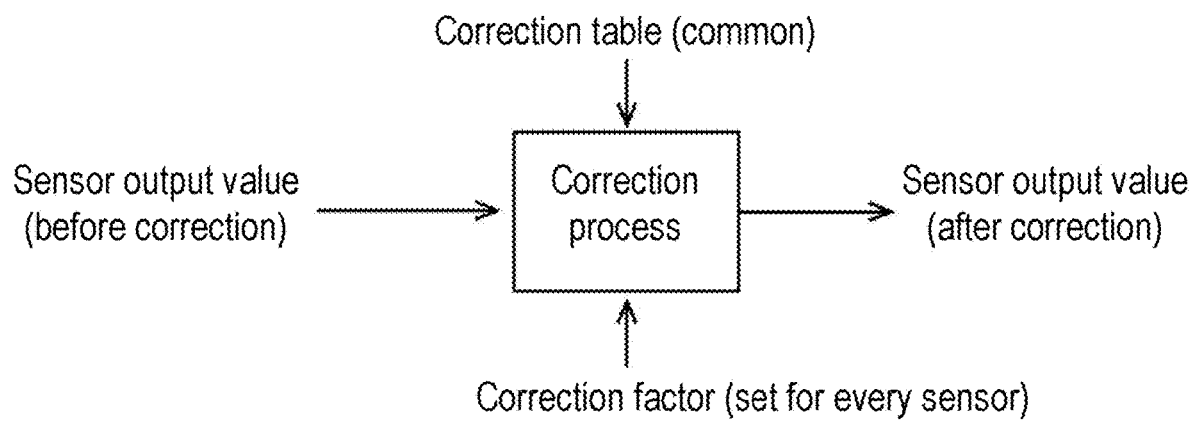
FIGS. 2A and 2B are views describing a correcting operation performed on an output value of an XYZ sensor 204.
Figure 2B:
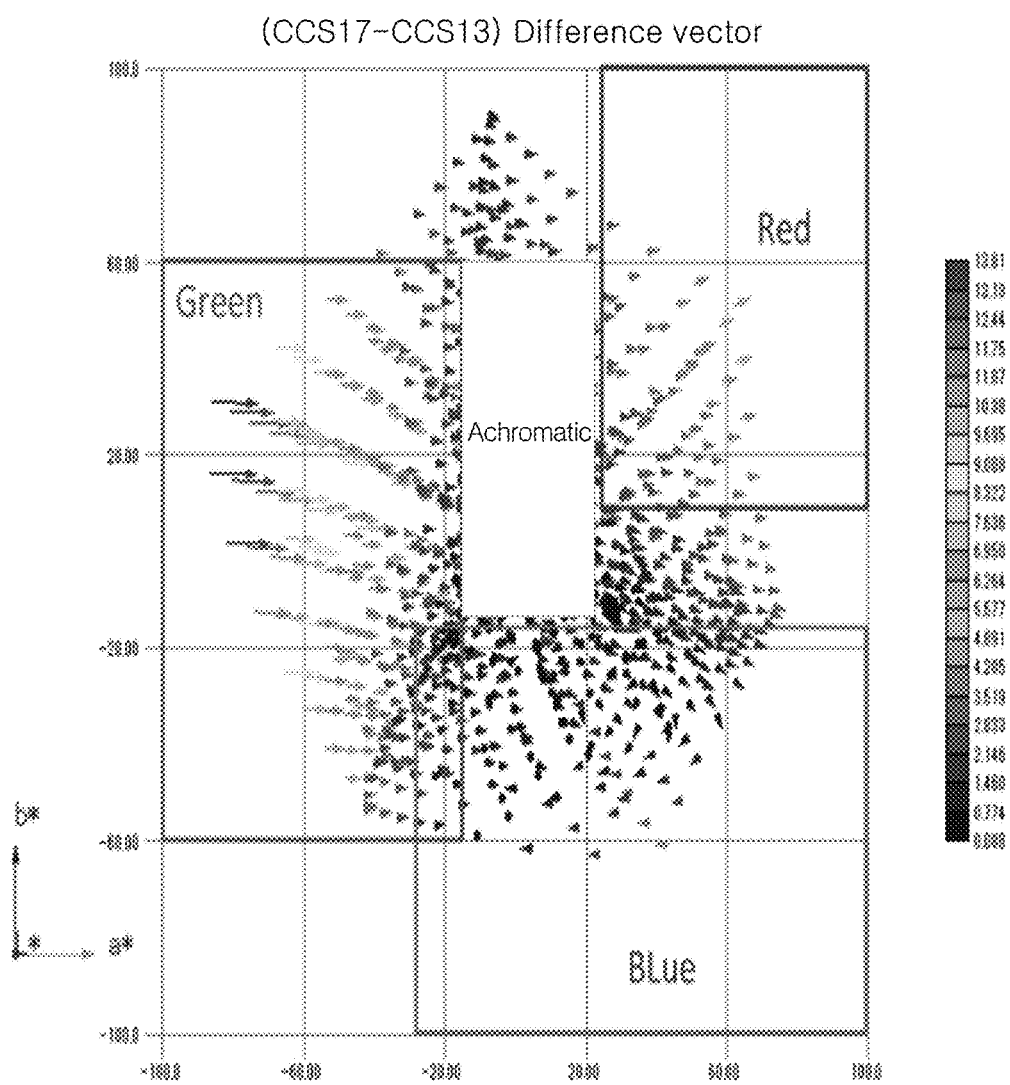

Subsequently, a correcting operation performed on the output value of the XYZ sensor 204 in the color measurement device 106, and the like will be described in detail below. FIGS. 2A and 2B are views describing the correcting operation performed on the output value of the XYZ sensor 204. FIG. 2A shows the correcting operation performed in the present example.

As also described above, a sensor that detects each stimulus value of X, Y, Z in the XYZ color system is used as the XYZ sensor 204 in the color measurement device 106. In this case, the corresponding Lab value can be calculated based on the acquired XYZ value. Therefore, in this case, the output value of the XYZ sensor 204 can be considered as, for example, a value associated with the color in the Lab color system. The Lab value corresponding to the output value of the XYZ sensor 204 can be considered, for example, as the Lab value or the like calculated as the measurement result of the XYZ sensor 204. More specifically, in the present example, the output value of the XYZ sensor 204 is converted into the Lab value, and then the correction process is performed. Therefore, in FIG. 2A, the sensor output value before the correction corresponds to the output value of the XYZ sensor 204 in a state after being converted to the Lab value and before being subjected to the correction. Furthermore, the sensor output value after the correction corresponds to the output value of the XYZ sensor 204 in a state after the correction process is performed on the sensor output value before correction.

Furthermore, as shown in the drawing, in the present example, the correction is performed on the output value of the XYZ sensor 204 using a correction table and a correction factor prepared in advance. The correction table is a table used to correct the Lab value corresponding to the output value of the XYZ sensor 204. Furthermore, in this case, a table common to the plurality of printing units 12 (see FIGS. 1A and 1B) in the printing system 10 is used as the correction table. Moreover, for example, it can be considered that the correction table is prepared in advance for a plurality of XYZ sensors 204. In this case, the plurality of XYZ sensors 204 are the plurality of XYZ sensors 204 included in the plurality of color measurement devices 106 (see FIGS. 1A and 1B) corresponding to the plurality of printing apparatuses 102 (see FIGS. 1A and 1B) to be subjected to equalization.

Furthermore, in the present example, a table in which the correction amount is associated with each position in the color space in the Lab color system is used as the correction table. In this case, the correction amount can be considered as a correction amount (basic correction amount) that becomes a basis commonly set with respect to the plurality of XYZ sensors 204. In the correction table, the basic correction amount is set to each value constituting the Lab value with respect to each position of the color space in the Lab color system. In this case, each position of the color space in the Lab color system is, for example, each position set on the color space at intervals set in advance according to the accuracy and the like required for printing. Furthermore, the intervals set in advance are, for example, intervals set in advance for each of the L value, the a value, and the b value. Further specific features of the correction table, way of creating the correction table, and the like will be described in more detail later.

The correction factor is a factor used to adjust the correction amount (basic correction amount) in the correction table. Furthermore, in the present example, the correction factor is set for every XYZ sensor 204 to adjust the strength of correction according to the characteristics of the respective XYZ sensors 204. Moreover, the correction factor can be considered as, for example, a correction parameter or the like individually prepared for the XYZ sensor 204. For example, it can be considered as a parameter or the like indicating the strength of correction applied to each of the XYZ sensors 204. Furthermore, in the present example, a factor indicating the application amount of the basic correction amount set in the correction table is used as the correction factor. In this case, to indicate the application amount of the basic correction amount means, for example, to indicate the extent the basic correction amount is reflected.

Furthermore, in this case, the color space in the Lab color system is divided into a plurality of regions (color regions) and the correction factor is set for every region (by region). In this case, to set the correction factor for each region means, for example, not to set the correction factor with respect to each position in the color space in the Lab color system at an interval set in advance like the basic correction amount in the correction table, but to set the correction factor in association with each of a plurality of regions obtained by dividing the color space into a plurality of regions in a larger range. In this case, for example, it is conceivable to divide the color space in the Lab color system into ten or less (e.g., about two to ten) regions and set a correction factor for every region. Furthermore, the number of regions for setting the correction factor is preferably about three to five. With this configuration, for example, the application amount of the basic correction amount can be appropriately adjusted without excessively increasing the number of regions. In addition, depending on the required printing quality and the characteristics of the printing apparatus to use, the color space in the Lab color system is not divided into a plurality of regions and the entire color space is treated as one region, and the correction factor may be set with respect to such a region.

More specifically, in the present example, for example, the color space in the Lab color system is divided into four regions, and correction factors are set for each region. FIG. 2B is a view showing an example of a way of setting the correction factor, and shows an example on a manner of dividing the color space in the Lab color system into four regions. In the figure, CCS17–CCS13 difference vector is the difference in the output characteristics of the two XYZ sensors 204 used in the operation of creating the correction table which will be described in more detail later.

As shown in the figure, in the present example, the color space in the Lab color system is divided into four regions of red, blue, green, and others (achromatic). In this case, the Red region is, for example, a region (red region) of a color close to red in the color space in the Lab color system. The Blue region is, for example, a region (blue region) of a color close to blue in the color space in the Lab color system. The Green region is, for example, a region (green region) close to green in the color space in the Lab color system. Furthermore, in this case, each region of Red, Blue, and Green is set to become a region of a predetermined range including the respective colors of red, blue, and green as surrounded by a rectangle in the figure. Moreover, as shown in the figure, the other regions are regions not included in each region of Red, Blue, and Green. In this case, the regions not included in each region of Red, Blue, and Green are, for example, all parts not included in each of the Red, Blue, and Green regions in the color space in the Lab color system. The other regions may be considered as, for example, an achromatic region corresponding to the tertiary color obtained when the inks of each color of C, M, and Y are mixed.

Furthermore, in the present example, a factor for L value, a factor for a value, and a factor for b value are set as the correction factor corresponding to each region. Therefore, when the color space in the Lab color system is divided into four regions as described above, the correction factor corresponding to one XYZ sensor 204 is configured by 12 factors as three factors are set for each region. In this case, the correction factor can be considered to be set, for example, for every region and every Lab (by region and by Lab).

Here, as described above, in the present example, a table in which the correction amount is associated with each position in the color space in the Lab color system is used as the correction table. In this case, the correction table is considered to have a large data amount as values (basic correction amounts) are set to many positions in the color space. On the other hand, in the case of the correction factor, since the value merely needs to be set only for limited number of regions as described above, the data amount is significantly smaller than that of the correction table. More specifically, consideration is made to save the correction table and the correction factor in any device, for example, in the form of a file (electronic data file) handled by an electronic device such as a computer. In this case, assuming that the file indicating the correction table is a correction table file and the file indicating the correction factor is a correction factor file, the capacity of the correction factor file corresponding to one XYZ sensor 204 can be made to, for example, less than or equal to $\frac{1}{1000}$ of the capacity of the correction table file. The capacity of the correction factor file corresponding to one XYZ sensor 204 is more preferably made to less than or equal to $\frac{1}{10000}$ of the capacity of the correction table file. More specifically, in the present example, the capacity of the correction table file is, for example, a capacity of about 9 to 13 MB (megabytes) (e.g., about 11 MB). On the other hand, the capacity of the correction factor file corresponding to one XYZ sensor 204 is, for example, about 0.9 to 1.3 KB (kilobyte) (e.g., about 1 KB). Therefore, according to the present example, for example, the output value corresponding to the characteristics of each of the XYZ sensors 204 can be appropriately corrected using, for example, a correction factor which data amount is significantly small compared to the correction table. Furthermore, for example, the amount of data of parameters used in the correction of the output value of the XYZ sensor 204 can be significantly and appropriately reduced.

Furthermore, as described above, in the present example, the correction factor is stored in the storage 210 (see FIGS. 1A and 1B) of the color measurement device 106. In this case, the correction factor can be appropriately stored even when the storage 210 having a small storage capacity is used by using the correction factor having a small data amount as described above. More specifically, when saving data of large amount of data such as a correction table, for example, in the color measurement device 106, for example, it becomes necessary to use the storage 210 having a large storage capacity. In this case, it is conceivable that the cost of the color measurement device 106 greatly increases. On the other hand, in a case where only the correction factor is stored in the color measurement device 106 as in the present example, the parameter for correction set for each of the XYZ sensors 204 can be appropriately saved in the color measurement device 106 including the relevant XYZ sensor 204 even when using the storage 210 with a small storage capacity.

Thus, according to the present example, for example, even when the color measurement device 106 including only the storage 210 with a small storage capacity is used, information unique to each XYZ sensor 204 can be appropriately stored in each color calibrator. Furthermore, for example, the correction factor can be appropriately saved while appropriately preventing the increase in the cost of the color measurement device 106. In this case, for example, it is conceivable to use a storage device capable of storing a correction factor and having insufficient storage capacity to store a correction table as the storage 210.

Consideration is made to store the correction table common to the plurality of XYZ sensors 204 in any device exterior to the color measurement device 106. In this case, for example, it is conceivable to store the correction table in the storage device or the like of the control PC 104 (see FIGS. 1A and 1B) in each printing unit 12 or the like. The correction table may be stored, for example, in a server or the like exterior to the printing system 10, and acquired from the server as needed.

Next, the way to create the correction table and the correction factor will be described. In the present example, when creating the correction table, first, an airframe to become the center of variation and an airframe having a large variation are selected from a plurality of color measurement devices 106 included in a plurality of printing units 12 in the printing system 10. In this case, the plurality of color measurement devices 106 included in the plurality of printing units 12 in the printing system 10 are, for example, a plurality of color measurement devices 106 corresponding to a plurality of XYZ sensors 204 targeted by one correction table.

Furthermore, in the example described below, one correction table is created (generated) for the seventeen color measurement devices 106 distinguished as CCS 1 to CCS 17. In this case, the color measurement is performed on the ECI chart under the same conditions by the respective color measurement devices 106 to acquire an ECI chart measurement value. In this case, the ECI chart is, for example, a color chart indicating a sample of a plurality of colors specified in a predetermined standard such as ECI. 2002. Furthermore, the ECI chart measurement value is a result of measuring the ECI chart using the XYZ sensor 204 in the color measurement device 106. Moreover, in the present example, data indicated by the ECI chart measurement value (ECI chart measurement data) is an example of data covering a wide color gamut.

Further, in this case, the range of variation of the output values of the plurality of XYZ sensors 204 is confirmed based on the ECI chart measurement values by the respective color measurement devices 106. Then, the airframe that becomes the center of variation in the characteristics and the airframe having a large variation are selected. In this case, the airframe that becomes the center of variation is, for example, the color measurement device 106 whose output value is the closest to the center of the range of variation. Furthermore, in the following, a case where the CCS 17 is selected as an airframe to become the center of variation will be described. In this case, the CCS 17 can be considered as a reference machine (reference airframe) in the plurality of color measurement devices 106 (CCS 1 to 17).

If there are a plurality of color measurement devices 106 whose output values are close to the center of the range of variation and it is difficult to determine which output value of the color measurement device 106 is the closest to the center, and the like any of the plurality of color measurement devices 106 may be selected as the airframe to become the center of variation. Furthermore, in the present example, the XYZ sensor 204 in the color measurement device 106 whose output value is the closest to the center of the range of variation is an example of a first colorimeter.

In addition, as an airframe having a large variation, the color measurement device 106 including the XYZ sensor 204 in which the characteristic of the output value is the farthest from the reference machine (CCS 17) is selected. In this case, the XYZ sensor 204 in the airframe having a large variation is an example of a second colorimeter. In this case as well, if there are a plurality of color measurement devices 106 having a large variation, and it is difficult to determine which color measurement device 106 to select, one of the plurality of color measurement devices 106 may be selected as an airframe having a large variation. In addition, in the following, a case where the CCS 13 is selected as an airframe having a large variation will be described.

After an airframe (CCS 17) that becomes the center of variation and an airframe (CCS 13) having a large variation are selected, the correction table is created through an IDW (reverse distance weighing) method from the difference in the ECI chart measurement values by the two color measurement devices 106. In this case, the difference in the ECI chart measurement values can be considered as, for example, an example of a difference in the output characteristics of the XYZ sensor 204. Accordingly, for example, a correction table that enables correction corresponding to the difference in characteristics between the CCS 17 and the CCS 13 can be appropriately created. Furthermore, in this case, the correction table can be considered as, for example, a table created based on a difference between the result of measuring a predetermined color by the XYZ sensor 204 corresponding to the first colorimeter, and the result of measuring a predetermined color by the XYZ sensor 204 corresponding to the second colorimeter different from the first colorimeter.

Furthermore, as described above, in the present example, the correction table is also used to correct the output value of the XYZ sensor 204 in the color measurement device 106 other than the two color measurement devices 106 used to create the correction table. Therefore, the plurality of XYZ sensors 204 targeted by the correction table can be considered to be targeting three or more XYZ sensors 204 including the XYZ sensors 204 other than the XYZ sensors 204 in the above two color measurement devices 106. More specifically, in the examples described above and below, one correction table targets 17 color measurement devices 106 distinguished as CCS 1 to CCS 17, as described above.

However, the CCS 1 to CCS 17 have different characteristics (output characteristics) from one another. Therefore, the output value cannot be appropriately corrected by merely using the correction table as it is with respect to the XYZ sensor 204 in the color measurement device 106 other than the CCS 13 used at the time of creating the correction table. On the other hand, in the present example, as described above, the correction factor is further used to correct the output value of each XYZ sensor 204.

Furthermore, at the time of creating the correction factor, based on the RAL chart measurement value (Lab) by the two color measurement devices 106 (CCS 13 and CCS 17) used to create the correction table and the RAL chart measurement value (Lab) by an airframe (color measurement device 106) to be corrected, a correction factor corresponding to the relevant airframe is calculated. In this case, the RAL chart measurement value (Lab) is a Lab value indicating the result of performing color measurement on the RAL chart using each of the color measurement devices 106. The RAL chart is a color chart of the RAL standard. For example, a commercially available RAL chart sold as a color sample can be suitably used as the RAL chart.

Furthermore, as described above, in the present example, the color space in the Lab color system is divided into a plurality of regions, and the correction factor is set for every region. In this case, it is conceivable to acquire a measurement value corresponding to a color patch (RAL color patch) corresponding to each region as an RAL chart measurement value (Lab). More specifically, as described above, in the present example, the color space in the Lab color system is divided into four regions of red, blue, green, and others (achromatic). In this case, with respect to the region of Red, the correction factor is calculated based on the measurement value on the RAL color patch indicating a predetermined red color. In this case, for example, a patch of RAL 3028, which is a color patch for Pure red color, can be suitably used as the RAL color patch indicating red. Furthermore, with respect to the region of Blue, the correction factor is calculated based on the measurement value on the RAL color patch indicating a predetermined blue color. In this case, for example, a patch of RAL 5002, which is a color patch for Ultramarine blue color, can be suitably used as the RAL color patch indicating blue. With respect to the region of Green, the correction factor is calculated based on the measurement value on the RAL color patch indicating a predetermined green color. In this case, for example, a patch of RAL 6029 which is a color patch for Mint green color can be suitably used as the RAL color patch indicating green. Moreover, in this case, with respect to these color patches, the result of measuring with each color measurement device 106 is compared with the result of measuring with two color measurement devices 106 used to create the correction table to calculate a correction factor corresponding to the applied strength of the basic correction amount for each value (L value, a value, and b value) constituting the Lab value. According to such a configuration, the correction factor corresponding to each color measurement device 106 can be appropriately calculated.

Here, as described above, in the present example, the color space in the Lab color system is divided into a plurality of region, and correction factor is set for every region and every Lab. However, in a case where a region and a Lab value (any of L value, a value, and b value) has a small basic correction amount in the correction table, it may be hardly necessary to use the correction factor as an index indicating the characteristics of each color measurement device 106. In this case, small basic correction amount in the correction table means, for example, that the difference (CCS 17-CCS 13) in the ECI chart measurement values by the two color measurement devices 106 used in the operation of creating the correction table is small. In such a case, it may be considered that the correction result may degrade by using the correction factor. Therefore, the corresponding correction factor may be set to zero for the region and Lab value having small basic correction amount in the correction table. More specifically, in an experiment (operation verification) specifically conducted by the inventors of the present application, there were cases in which the difference became small for the L value of each region and the b value of the Blue and Green regions. Therefore, the correcting process is executed with the correction factor set to zero on such regions and Lab values. In addition, among the four regions into which the color space in the Lab color system is divided, a value same as the correction factor corresponding to a region, among the regions of Red, Blue, and Green, having high correlation with other region may be used as the correction factor corresponding to the other region. More specifically, in this case, for example, it is conceivable to use the same value as the correction factor corresponding to the Red region as the correction factor corresponding to the other region.

As a manner of dividing the region in a case of setting the correction factor for each region, it is also conceivable to divide into region to other than four regions described above. In this case, as the manner of dividing the region, for example, it is conceivable to divide the region according to the magnitude of the correction amount (basic correction amount) set in the correction table. In this case, the magnitude of the correction amount is a value corresponding to the magnitude of the difference (difference between CCS 17 and CCS 13) in the ECI chart measurement values by the two color measurement devices 106 used to create the correction table. Even when the region is divided in such a manner, a correction factor corresponding to the respective region can be set for each of the color measurement devices 106 in the same manner as described above.

Subsequently, the operation of the correction, the result of the correction, and the like performed using the correction table and the correction factor will be described in more detail. As described above, in the present example, the correction is performed on the output value of the XYZ sensor 204 in each of the color measurement devices 106 using the correction table and the correction factor. In this case, first, the correction table is referred to using, as an index, a Lab value (Lab measurement value) obtained by measuring a color using the airframe to be corrected (color measurement device 106). The basic correction amount corresponding to the Lab measurement value is thereby acquired. Furthermore, this operation can also be considered, for example, as an operation or the like for obtaining each Lab correction amount to become the basis with reference to the correction table using the Lab measurement value of the airframe to be corrected as an index.

After the basic correction amount is acquired, the correction value corresponding to each of the Lab values is calculated by multiplying the correction factor (correction factor corresponding to each of the Lab values) to the basic correction amount obtained by referencing the correction table for each of the Lab values. In this case, the correction value is a value to be added to the Lab measurement value at the time of correction. Furthermore, this operation can also be considered, for example, as an operation or the like for calculating each Lab correction value by multiplying each Lab correction factor to each Lab basic correction amount obtained by referring to the table. Moreover, in this case, for the correction factor to be used, for example, the correction factor corresponding to the Lab measurement value is used by determining to which region of a plurality of regions (four regions of Red, Blue, Green, and others) the Lab measurement value corresponds for the Lab measurement value used as an index at the time of referring to the correction table.

After the correction value is calculated, a correction process (Lab correction) is performed by adding the correction value to the Lab measurement value acquired by the airframe to be corrected. The output value after correction is thereby calculated as the output value of the airframe to be corrected. Furthermore, in the present example, the output value of the airframe to be corrected can be considered as, for example, the output value of the XYZ sensor 204 of the relevant airframe. This operation can be considered, for example, as an operation or the like for obtaining the Lab value after correction by adding each calculated Lab correction value to each Lab measurement value of the airframe to be corrected. According to this configuration, for example, the Lab value measured using the XYZ sensor 204 can be appropriately corrected so as to suppress the influence of the characteristic variation.

Figure 3:
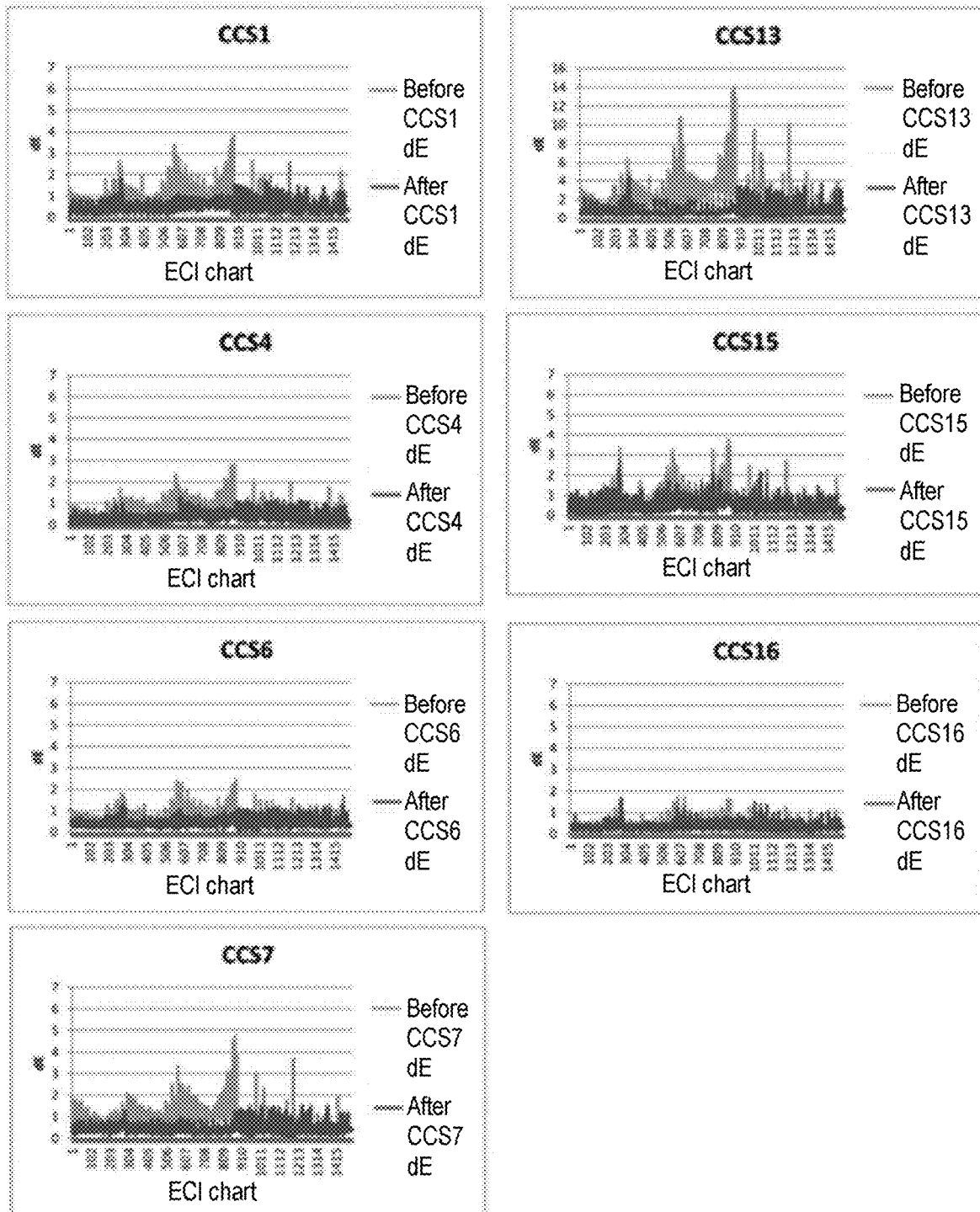
FIG. 3 is a view describing the effect of the correction performed in the present example.

FIG. 3 is a view describing the effect of correction performed in the present example, and shows a part of the result of the experiment actually conducted by the inventors of the present application. In this experiment, measurement of the ECI chart was performed by seven color measurement devices 106 (see FIGS. 1A and 1B) indicated as CCS 1, 4, 6, 7, 13, 15, 16 in the figure. Furthermore, in this measurement, a comparison is made between the case where correction is performed and the case where correction is not performed (comparison by presence or absence of Lab correction) by using a measurement application software incorporating the function of correction performed using the correction table and correction factor described above. Moreover, in this comparison, the comparison was made on the difference (ΔE) in the measurement result from the CCS 17 which is the color measurement device 106 used as a reference device at the time of creating the correction table. As shown in the figure, it can be seen that ΔE becomes smaller after applying the correction. Furthermore, as can be understood from the result, according to the present example, the characteristics of the XYZ sensor 204 can be appropriately corrected when color measurement is performed using the color measurement device 106 including the XYZ sensor 204. Thus, for example, the measurement of the color printed by the printing apparatus 102 (see FIGS. 1A and 1B) can be more appropriately performed while appropriately suppressing the influence of the variation in the characteristic of the XYZ sensor 204.

Here, when such correction is performed, a method (color measurement method) of measuring a color using the color measurement device 106 can be considered as, for example, a method including a color measuring step and a correcting step. In this case, the color measuring step is, for example, a step of measuring the color printed by the printing apparatus 102 with the XYZ sensor 204 in the color measurement device 106. The correcting step is, for example, a step of correcting an output value output from the XYZ sensor 204 in the color measuring step. The operation of the correcting step can be considered, for example, as an operation to be performed later than the operation of the color measuring step. In this case, in the color measuring step, for example, the output value of the XYZ sensor 204 is acquired without performing the correction using the correction table and the correction factor. In a modified example of the operation of the color measurement method, the operation of the correcting step may, for example, be performed simultaneously with the operation of the color measuring step. In this case, in the color measuring step, an output value after the correction using the correction table and the correction factor is acquired.

Furthermore, as described above, according to the present example, the color measurement can be appropriately carried out while suppressing the influence of the variation in the characteristics of the XYZ sensor 204. In this regard, when color measurement is performed using the XYZ sensor 204, the XYZ values and the Lab values under a light source such as a light source of a spectral distribution approximate to D50, for example, are acquired, as opposed to a case where the color is usually measured by a spectral color measuring instrument and the like. Therefore, even if the correction as described above is performed, it is difficult to measure or the like a color or the like for creating an accurate ICC profile.

However, for example, when equalization or the like is performed, even if the accurate ICC profile is not created, it is considered sufficient if it can be determined as the same color with an appropriate accuracy when the measurement is performed on the same color under the same environment for the results of the color measurement by the plurality of XYZ sensors 204. In this case as well, the influence of the variation of the XYZ sensor 204 can be appropriately suppressed by using the correction table and the correction factor as described above. Therefore, according to the present example, equalization and the like can be appropriately performed using the color measurement device 106 including the XYZ sensor 204.

Furthermore, more specifically, when performing equalization, for example, a predetermined color chart is printed by a plurality of printing apparatuses 102, and color adjustment is performed based on the color measurement result with respect to the color chart. In this case, the plurality of printing apparatuses 102 refer to the plurality of printing apparatuses 102 included in the plurality of printing units 12 (see FIGS. 1A and 1B) in the printing system 10. As the color chart, for example, it is conceivable to use a chart of a pattern including patches of a plurality of colors set in advance. Further, the color measurement result with respect to the color chart is the result of measuring the color by the color measurement device 106 included in the same printing unit 12 as the respective printing apparatus 102. The measurement result is a measurement result corresponding to the output value of the XYZ sensor 204 after correction using the correction table and the correction factor is performed.

According to this configuration, for example, the characteristics of the color generated in the print result of each printing apparatus 102 can be appropriately acquired by printing a common color chart by each printing apparatus 102. Furthermore, in this case, as described above, the influence of variations in the characteristics of the XYZ sensor 204 can be appropriately suppressed by performing correction on the output value of the XYZ sensor 204. Moreover, in this case, the color adjustment is performed based on the measurement results obtained in this way, for example, so that the colors printed by the respective printing apparatuses 102 approach a preset standard state. With this configuration, for example, the colors printed by the respective printing apparatuses 102 can be appropriately adjusted. Thus, for example, equalization with respect to a plurality of printing apparatuses 102 can be appropriately executed.

Next, matters related to equalization among the effects of correction performed in the present example will be described in more detail. FIG. 4 is a view describing the effect of correction performed in the present example, and shows an example of a difference in the result of equalization according to the presence or absence of correction. More specifically, in FIG. 4, two sensors with large characteristic variations are extracted from 100 XYZ sensors 204 prepared by the inventors of the present application, and an example of a difference in the result of equalization according to the presence or absence of correction is shown. Furthermore, when the equalization, which results are shown in FIG. 4, is executed, a correction is performed using a correction table created for a plurality of XYZ sensors 204 in a plurality of color measurement devices 106 including a color measurement device 106 other than CCS 13 and CCS 15 and a correction factor created for every color measurement device 106.

Furthermore, in FIG. 4, before application of the correction table refers to a case where equalization is performed without performing a correction using the correction table and the correction factor. After application of the correction table refers to a case where equalization is performed after a correction using the correction table and the correction factor is performed. Furthermore, in this case, correction using the correction table and the correction factor is performed on all the regions. Before calibration and after calibration refer to before and after the equalization is performed. The numerical values shown in the figure are the measurement values of the color difference (color difference $\Delta E$) that occurs when a color of the same setting is printed by two printing apparatuses 102 corresponding to CCS 13 and CCS 15, and shows the difference on the measurement result for each of cyan (C), magenta (M), yellow (Y), red (R), green (G), blue (B), and gray which is a tertiary color. Furthermore, the numerical value shown in association with the character CCS indicates the difference calculated based on the result of measuring the color with the color measurement device 106 including the XYZ sensor 204. The numerical values shown in association with the characters FD-9 indicate the differences calculated based on the results of measuring the color with the FD-9 device which is a spectral color measuring instrument. As for the result of equalization, determination is made as pass (OK) when $\Delta E$ is less than 2 ($\Delta E<2$), and fail (NG) when $\Delta E$ is greater than 2 ($\Delta E>2$).

When the average of $\Delta E$ is calculated based on the numerical values shown in the figure, the average $\Delta E$ after calibration (after equalization is performed) when correction is not performed is about 2.6 (2.59). In this case, it is assumed that the influence of variation in the characteristics of the XYZ sensor 204 appeared, and equalization at high accuracy cannot be performed. On the other hand, the average $\Delta E$ when the correction is performed is 1.53, thus improving to less than 2 ($\Delta E<2$), which is pass. In this case, it is assumed that the influence of the variation in the characteristic of the XYZ sensor 204 is appropriately suppressed by the correction.

Next, supplementary description and the like will be made regarding each configuration described above. As described above, according to the present example, for example, the influence of the variation in the characteristics of the XYZ sensor 204 can be appropriately suppressed when the color measurement device 106 including the XYZ sensor 204 is used. Thus, for example, the equalization can be appropriately performed with high accuracy using the low-cost color measurement device 106.

In this case, as the configuration of the sensor unit is simplified, the color measurement device 106 can be appropriately miniaturized, and the like. As a result, the color measurement device 106 can be easily mounted, for example, on the printing apparatus 102. In this case, it can be considered that the color measurement device 106 forms, for example, a part of the printing apparatus 102. With this configuration, for example, equalization and the like can be performed more easily by using the color measurement device 106 mounted on the printing apparatus 102. Furthermore, in this case, with regard to the relationship between the printing apparatus 102 and the color measurement device 106 and the plurality of printing apparatuses 102 to be subjected to equalization, it can be considered that one color measurement device 106 is associated with one printing apparatus 102 by mounting the color measurement device 106 on the printing apparatus 102. Moreover, when considering the relationship between the XYZ sensor 204 in the color measurement device 106 included in each printing apparatus 102 and the correction table, for example, it is conceivable that the correction table is prepared in advance for a plurality of XYZ sensors 204 including the XYZ sensor 204 other than the XYZ sensor 204 in the color measurement device 106 of one printing apparatus 102.

In the printing system 10 of the present example, for example, color adjustment is performed by equalization, and the operation of the printing apparatus 102 is controlled based on parameters and the like set at the time of adjustment. Furthermore, in this case, the output value of the XYZ sensor 204 in the color measurement device 106 is corrected at the time the equalization is performed. Therefore, the control of the operation of the printing apparatus 102 can be considered, for example, as control using a value obtained by correcting the output value of the XYZ sensor 204.

In the description made above, regarding the configuration of each printing unit 12 in the printing system 10, a case where the printing apparatus 102 is considered as an example of a printing portion, and the control PC 104 is considered as an example of a controller has been mainly described. However, depending on the configuration of the printing system 10, configurations other than the above can be considered as a printing portion, a controller, or the like. More specifically, for example, an inkjet head in the printing apparatus 102 can also be considered as a printing portion. The controller built in the printing apparatus 102 can also be considered as a controller that controls the operation of the printing portion.

Furthermore, as described above, according to the present example, the influence of the variation in the characteristics of the XYZ sensor 204 can be appropriately suppressed. However, in order to obtain the effect of correction more appropriately, it is desirable to appropriately suppress the influence of the measurement conditions themselves at the time of color measurement performed using the color measurement device 106. More specifically, when color measurement is performed using a color calibrator such as the color measurement device 106, a gap between the XYZ sensor 204, which is a sensor, and the color chart always needs to be maintained at a constant distance in order to perform an accurate measurement (color measurement). On the other hand, it is conceivable to use media of various thicknesses as a medium for printing a color chart. In this case, if the position of the XYZ sensor 204 in the height direction is fixed, the gap changes by the thickness of the medium.

Therefore, the position of the XYZ sensor 204 in the height direction is preferably adjustable. Furthermore, in this case, it is conceivable to install the color measurement device 106 on the printing apparatus 102 in a state of being movable in the vertical direction (thickness direction of medium). More specifically, as such a configuration, for example, consideration is made to installing the color measurement device 106 on the printing apparatus 102 using a mechanism including a solenoid and a rotation roller for driving the color measurement device 106 up and down. In this case, the position of the XYZ sensor 204 in the vertical direction changes in accordance with the position of the rotation roller. Furthermore, the rotation roller is brought into contact with the surface (medium surface) of the medium by lowering the solenoid (down) downward. Then, at the time of color measurement by the color measurement device 106, the rotation roller is brought into contact with the surface of the medium by lowering the solenoid downward. According to such a configuration, the gap can be always maintained constant, for example, without being subjected to the influence of the thickness of the medium at the time of measurement. In this case, it is conceivable to maintain the gap at a constant distance of about 3 to 5 mm (e.g., about 4 mm). Furthermore, at the timing the color measurement by the color measurement device 106 is not performed, the rotation roller and the medium can be brought into a non-contact state by raising (up) the solenoid. Thus, for example, the occurrence of jamming of the medium at the time of printing, the formation of roller marks on the surface to be printed, and the like can be appropriately prevented. In this case, it is conceivable to make the gap greater than or equal to 10 mm (e.g., about 11 mm).

In addition, in the case of performing color measurement on a color chart including color patches of a plurality of colors, proper measurement cannot be performed if shift occurs in the correspondence relationship between the color patch and the measurement result. More specifically, when performing the color measurement by the color measurement device 106, for example, it is conceivable to mount the color measurement device 106 on a carriage that holds an inkjet head or the like in the printing apparatus 102, and continuously perform the color measurement while moving the carriage in a predetermined scanning direction. In this case, a color patch to be subjected to color measurement at each timing is specified by controlling the timing to cause the white LED used as the light source to emit light. In this case, if a shift occurs in the timing to cause the white LED to emit light, a shift may occur in the position to be measured, and the wrong color may be measured. Therefore, in order to appropriately perform color measurement on the color patches of each color by the color measurement device 106, the white LED needs to emit light in accordance with the timing when the position of the color measurement device 106 matches the position of the color patch to be measured. For that purpose, for example, how to generate the timing of causing the white LED to emit light becomes important.

On the other hand, in order to cause the white LED to emit light at the correct timing, for example, it is conceivable to use a signal generated by a linear encoder for printing provided in the printing apparatus 102. In this case, the linear encoder for printing is, for example, a linear encoder used to control the position of the carriage at the time of the main scan. The main scan is an operation of causing the inkjet head to eject ink while moving the inkjet head in a predetermined main scanning direction. More specifically, in this case, for example, when the carriage is moved to the measurement start position of the color chart, a trigger command indicating the start of color measurement is generated and transmitted to the color measurement device 106. In this case, the color measurement device 106 starts a predetermined measurement sequence by receiving the trigger command. Thereafter, an accurate continuous color measurement can be realized by transmitting a trigger command to the color measurement device 106 for every color patch. Furthermore, in this case, it is possible to make it less susceptible to the speed (scan speed) at which the carriage is moved by generating a trigger command using a linear encoder, as compared to for example, a case where a trigger command is generated using a timer and the like. In addition, for example, the accuracy of color measurement can be more appropriately enhanced.

INDUSTRIAL APPLICABILITY

The present disclosure can be suitably used, for example, in a color measurement method.

What is claimed is:

1. A color measurement method for measuring a color printed by a printing apparatus, the color measurement method comprising:
   a color measuring step of measuring the color printed by the printing apparatus with a corresponding colorimeter among a plurality of colorimeters; and
   a correcting step of correcting an output value output by the corresponding colorimeter in the color measuring step,
   wherein in the correcting step, the output value is corrected using:
      a correction table in which a correction amount is associated with each position of a color space in an Lab color system, the correction table being prepared in advance for the plurality of colorimeters, and a correction factor used to adjust the correction amount in the correction table, the correction factor being individually prepared with respect to the corresponding colorimeter used in the color measuring step;

wherein the color space in the Lab color system is divided into a plurality of regions, and the correction factor is set for each region, and a factor for L value, a factor for a-value, and a factor for b-value are set as the correction factor corresponding to each of the regions.

2. The color measurement method according to claim 1, wherein an XYZ sensor is used as the corresponding colorimeter.

3. The color measurement method according to claim 1, wherein each of the plurality of colorimeters targeted by the correction table is associated with different printing apparatuses, and is used when measuring the color printed by a corresponding printing apparatus.

4. The color measurement method according to claim 1, wherein in the correcting step, a correction table file which is a file indicating the correction table, and a correction factor file which is a file indicating the correction factor, are used; and a capacity of the correction factor file corresponding to one of the colorimeters is less than or equal to 1/1000 of a capacity of the correction table file.

5. The color measurement method according to claim 1, wherein in the color measuring step, a color measurement is performed using a color calibrator, which is a member used to adjust the color of the printing apparatus and which includes the corresponding colorimeter and a storage that stores the correction factor corresponding to the corresponding colorimeter, the storage has a storage capacity for storing the correction factor but insufficient to store the correction table, and in the correcting step, the output value output by the corresponding colorimeter is corrected using the correction factor stored in the storage and the correction table stored in any device exterior to the color calibrator.

6. A color adjustment method for adjusting a color printed by a printing apparatus, the color adjustment method comprising:

printing a predetermined color chart by the printing apparatus;

measuring a color indicated by a print result through the color measurement method according to claim 1; and adjusting the color based on a measurement result so that the color printed by the printing apparatus approaches a standard state set in advance.

7. A color measurement method for measuring a color printed by a printing apparatus, the color measurement method comprising:

a color measuring step of measuring the color printed by the printing apparatus with a corresponding colorimeter among a plurality of colorimeters; and a correcting step of correcting an output value output by the corresponding colorimeter in the color measuring step, wherein in the correcting step, the output value is corrected using:

a correction table in which a correction amount is associated with each position of a color space in an Lab color system, the correction table being prepared in advance for the plurality of colorimeters, and a correction factor used to adjust the correction amount in the correction table, the correction factor being individually prepared with respect to the corresponding colorimeter used in the color measuring step;

wherein the correction table is a table created based on a difference between:

a result of measuring a predetermined color with a first colorimeter, and a result of measuring the predetermined color with a second colorimeter different from the first colorimeter.

8. The color measurement method according to claim 7, wherein the plurality of colorimeters targeted by the correction table are three or more colorimeters including the first colorimeter and the second colorimeter, and the correction table is created by confirming a range of variation of the output values of the plurality of colorimeters, and using a colorimeter whose output value is closest to a center of the range of variation as the first colorimeter, and using a colorimeter in which a characteristic of the output value is farthest from the first colorimeter as the second colorimeter.

9. A printing system that performs a printing through an inkjet method, and the printing system comprising:

a printing portion that ejects ink droplets;

a controller that controls an operation of the printing portion; and a corresponding colorimeter among a plurality of colorimeters that measures a color printed by the printing portion, wherein the controller controls the operation of the printing portion using a value obtained by correcting an output value of the corresponding colorimeter, and as a value obtained by correcting the output value of the corresponding colorimeter, a value obtained by correcting the output value using a correction table and a correction factor is used, the correction table being a table in which a correction amount is associated with each position of a color space in an Lab color system, and the correction table being prepared in advance for the plurality of colorimeters including a colorimeter other than the corresponding colorimeter of the printing portion, and the correction factor being used to adjust the correction amount in the correction table, and the correction factor being individually prepared with respect to the corresponding colorimeter of the printing portion;

wherein the color space in the Lab color system is divided into a plurality of regions, and the correction factor is set for each region, and a factor for L value, a factor for a-value, and a factor for b-value are set as the correction factor corresponding to each of the regions.

* * * * *